United States Patent
Chen et al.

(10) Patent No.: US 12,008,471 B2
(45) Date of Patent: Jun. 11, 2024

(54) ROBUSTNESS ASSESSMENT FOR FACE RECOGNITION

(71) Applicant: NEC Laboratories America, Inc., Princeton, NJ (US)

(72) Inventors: Zhengzhang Chen, Princeton Junction, NJ (US); Haifeng Chen, West Windsor, NJ (US); Liang Tong, Manchester, MO (US)

(73) Assignee: NEC Corporation, Tokyo (JP)

( * ) Notice: Subject to any disclaimer, the term of this patent is extended or adjusted under 35 U.S.C. 154(b) by 447 days.

(21) Appl. No.: 17/464,127

(22) Filed: Sep. 1, 2021

(65) Prior Publication Data

US 2022/0067432 A1    Mar. 3, 2022

Related U.S. Application Data

(60) Provisional application No. 63/108,985, filed on Nov. 3, 2020, provisional application No. 63/082,489, filed
(Continued)

(51) Int. Cl.
*G06N 3/08* (2023.01)
*G06F 18/21* (2023.01)
(Continued)

(52) U.S. Cl.
CPC .......... *G06N 3/08* (2013.01); *G06F 18/2163* (2023.01); *G06F 18/28* (2023.01); *G06V 10/22* (2022.01);
(Continued)

(58) Field of Classification Search
CPC .......... G06N 3/08; G06N 3/045; G06N 3/084; G06F 18/2163; G06F 18/28; G06V 10/22;
(Continued)

(56) References Cited

U.S. PATENT DOCUMENTS

2019/0238568 A1* 8/2019 Goswami .............. G06F 21/566
2019/0332851 A1* 10/2019 Han ...................... G06V 40/171
(Continued)

OTHER PUBLICATIONS

Sharif, Mahmood, et al. "Accessorize to a crime: Real and stealthy attacks on state-of-the-art face recognition", InProceedings of the 2016 acm sigsac conference on computer and communications security. Oct. 24, 2016, pp. 1528-1540.
(Continued)

*Primary Examiner* — Wesley J Tucker
(74) *Attorney, Agent, or Firm* — Joseph Kolodka (57) ABSTRACT

Methods and systems for evaluating and enhancing a neural network model include constructing a surrogate model that corresponds to a target neural network model, based on a degree of knowledge about the target neural network model. Adversarial attacks against the surrogate model are generated, based on an attack goal, a level of attacker capability, and an attack model. The target neural network model is tested for accuracy under the generated adversarial attacks to determine a degree of robustness of the target neural network model. Robustness of the target neural network model is enhanced by replacing facial occlusions in input images before applying the input images to the target neural network.

20 Claims, 6 Drawing Sheets

Related U.S. Application Data on Sep. 24, 2020, provisional application No. 63/074,022, filed on Sep. 3, 2020, provisional application No. 63/074,023, filed on Sep. 3, 2020.

(51) Int. Cl.
  *G06F 18/28* (2023.01)
  *G06V 10/22* (2022.01)
  *G06V 40/16* (2022.01)

(52) U.S. Cl.
  CPC .......... *G06V 40/171* (2022.01); *G06V 40/172* (2022.01)

(58) Field of Classification Search
  CPC .. G06V 40/171; G06V 40/172; G06V 10/764; G06V 10/774; G06V 10/776; G06V 10/82
  See application file for complete search history.

(56) References Cited

U.S. PATENT DOCUMENTS

2021/0300433 A1\* 9/2021 Vorobeychik ........ G06V 10/751
2021/0374468 A1\* 12/2021 Chandraker ........... G06N 3/084
2022/0269893 A1\* 8/2022 Dammu ................ G06V 10/454

OTHER PUBLICATIONS

Dong, Yinpeng, et al. "Efficient decision-based black-box adversarial attacks on face recognition" InProceedings of the IEEE/CVF Conference on Computer Vision and Pattern Recognition. Jun. 2019, pp. 7714-7722.

Wu, Tong, et al. "Defending against physically realizable attacks on image classification", Published as a conference paper at ICLR 2020. Sep. 20, 2019, pp. 1-26.

\* cited by examiner

ROBUSTNESS ASSESSMENT FOR FACE RECOGNITION

RELATED APPLICATION INFORMATION

This application claims priority to U.S. Provisional Patent Application No. 63/074,022, filed on Sep. 3, 2020, U.S. Provisional Patent Application No. 63/074,023, filed on Sep. 3, 2020, U.S. Provisional Patent Application No. 63/082,489, filed on Sep. 24, 2020, and U.S. Provisional Patent Application No. 63/108,985, filed on Nov. 3, 2020, incorporated herein by reference in its entirety. This application is related to an application entitled "ROBUSTNESS ENHANCEMENT FOR FACE RECOGNITION," having U.S. Utility patent application Ser. No. 17/464,148, filed Sep. 1, 2021, and which is incorporated by reference herein in its entirety.

BACKGROUND

Technical Field

The present invention relates to facial recognition systems, and, more particularly, to identifying and bolstering weaknesses in facial recognition systems.

Description of the Related Art

Facial recognition systems are widespread and used in a number of different contexts. However, while facial recognition has proven successful in many different real-world applications, they may be vulnerable to adversarial attacks, where small perturbations on the input can mislead these systems. Such vulnerabilities can cause severe damage in high-security applications.

SUMMARY

A method for evaluating and enhancing a neural network model includes constructing a surrogate model that corresponds to a target neural network model, based on a degree of knowledge about the target neural network model. Adversarial attacks against the surrogate model are generated, based on an attack goal, a level of attacker capability, and an attack model. The target neural network model is tested for accuracy under the generated adversarial attacks to determine a degree of robustness of the target neural network. Robustness of the target neural network model is enhanced by replacing facial occlusions in input images before applying the input images to the target neural network.

A method of evaluating and enhancing a neural network model includes constructing an ensemble of surrogate models that correspond to a target neural network model, based on lack of attacker knowledge about a structure of the target neural network model. Adversarial attacks against the surrogate model are generated, according to multiple different sets of assumptions about an attack goal, a level of attacker capability, and an attack model, by solving optimization problems that correspond to different respective combinations of attack model and attack goal. The target neural network model is tested for accuracy under the generated adversarial attacks to determine a degree of robustness of the target neural network. Robustness of the target neural network model is enhanced by replacing facial occlusions in input images before applying the input images to the target neural network.

A system for evaluating and enhancing a neural network model includes a hardware processor and a memory that stores a computer program product. When executed by the hardware processor, the computer program product causes the hardware processor to construct a surrogate model that corresponds to a target neural network model, based on a degree of knowledge about the target neural network model, to generate adversarial attacks against the surrogate model, based on an attack goal, a level of attacker capability, and an attack model, to test the target neural network model for accuracy under the generated adversarial attacks to determine a degree of robustness of the target neural network, and to generate an occlusion replacer that replaces facial occlusions in input images before applying the input images to the target neural network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To address the possibility of adversarial attacks against facial recognition systems, the robustness of such systems may be evaluated and bolstered. Thus, existing facial recognition systems may be assessed to determine their vulnerability to intentionally damaging inputs. For those facial recognition systems that are found to be vulnerable, robustness may be enhanced, for example by processing input images to identify and remediate occlusions.

Figure 1:
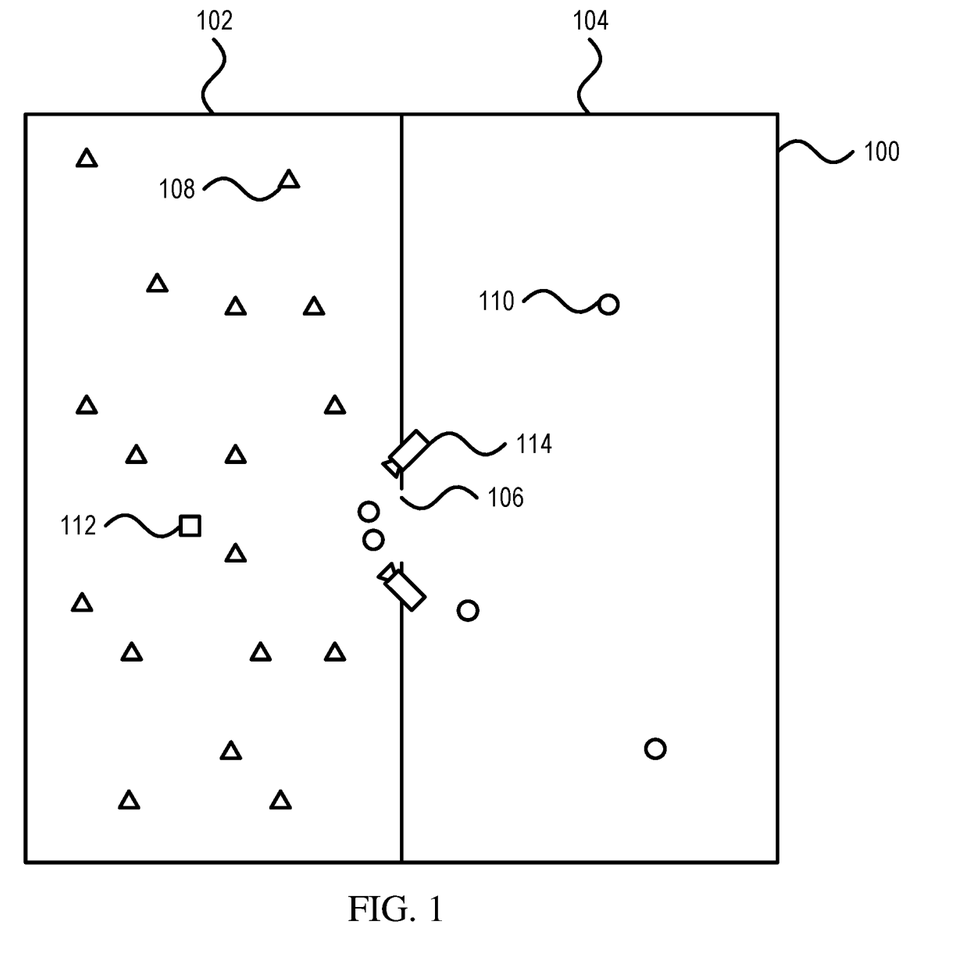
FIG. 1 is a diagram of a monitored environment, including an attacker that seeks to subvert a facial recognition system, in accordance with an embodiment of the present invention.

Referring now to FIG. 1, an exemplary monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is an attacker 112, shown as a square. The unauthorized individuals 108 are permitted access to the uncontrolled region 102, but not to the controlled region 104. The authorized individuals are permitted access to both the uncontrolled region 102 and the controlled region 104. The attacker 112 is seeks to undermine the efficacy of the facial recognition system, for example by providing visual inputs that affect the facial recognition model being used.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104.

The video streams generated by the video cameras 114 may be processed to identify objects within the frames of the video streams. Although face detection is specifically described herein, it should be understood that any kind of processing may be performed, for example to identify vehicles, license plates, animals, etc. The detected object may be compared to objects in a watchlist. In the case of faces, a similarity metric may be used to compare a detected face from a frame of the video streams to a set of different faces that are stored in the watchlist.

Facial recognition systems can solve various tasks, such as face identification and face verification. Face identification returns an identity associated with a given face, while face verification indicates whether a given face has the same identity as a stored face image. Face recognition problems can further be categorized into closed-set and open-set problems, depending on whether all testing identities are predefined in the training data.

In closed-set face recognition systems, all testing samples' identities are known in advance. In this scenario, face identification can be expressed as a multi-class classification problem, where face verification is an extension of face identification and classification is performed twice, with the predicted identity being compared to the identity of the stored face.

In contrast, for an open-set scenario, there may be no overlap between identities in the training data and the testing set. In this context, face verification may be expressed as a metric learning problem, which may be solved by training a feature extractor that maps faces into a discriminative feature space and that then evaluates the distance between feature vectors of the test face and the stored face image. The face identification of open-set face recognition may be an extension of face verification, by comparing the similarities between the feature vector of the test face and each face in a gallery of stored face images.

In an adversarial attack, the attacker 112 introduces inputs that have been selected to be recognized incorrectly by the facial recognition model. When such inputs are used for training, they can result in a model that misclassifies faces, potentially allowing the attacker 112 to appear to be an authorized individual in some cases, and in other cases frustrating the detection of the attacker as a person on a watchlist. The malicious data may be inserted into a training data corpus ab initio, or may be introduced during the use of a system that performs online training.

At least two types of adversarial attacks may be used against machine learning systems. A poising attack may be performed at the time of training, such that the machine learning system is trained incorrectly, resulting in a system that makes incorrect predictions on certain samples once the model is deployed. A decision-time attack may be performed after the machine learning system has been deployed. While the present embodiments are described in the context of a decision-time attack, it should be understood that the present principles may be applied to other types of attack as well.

Figure 2:
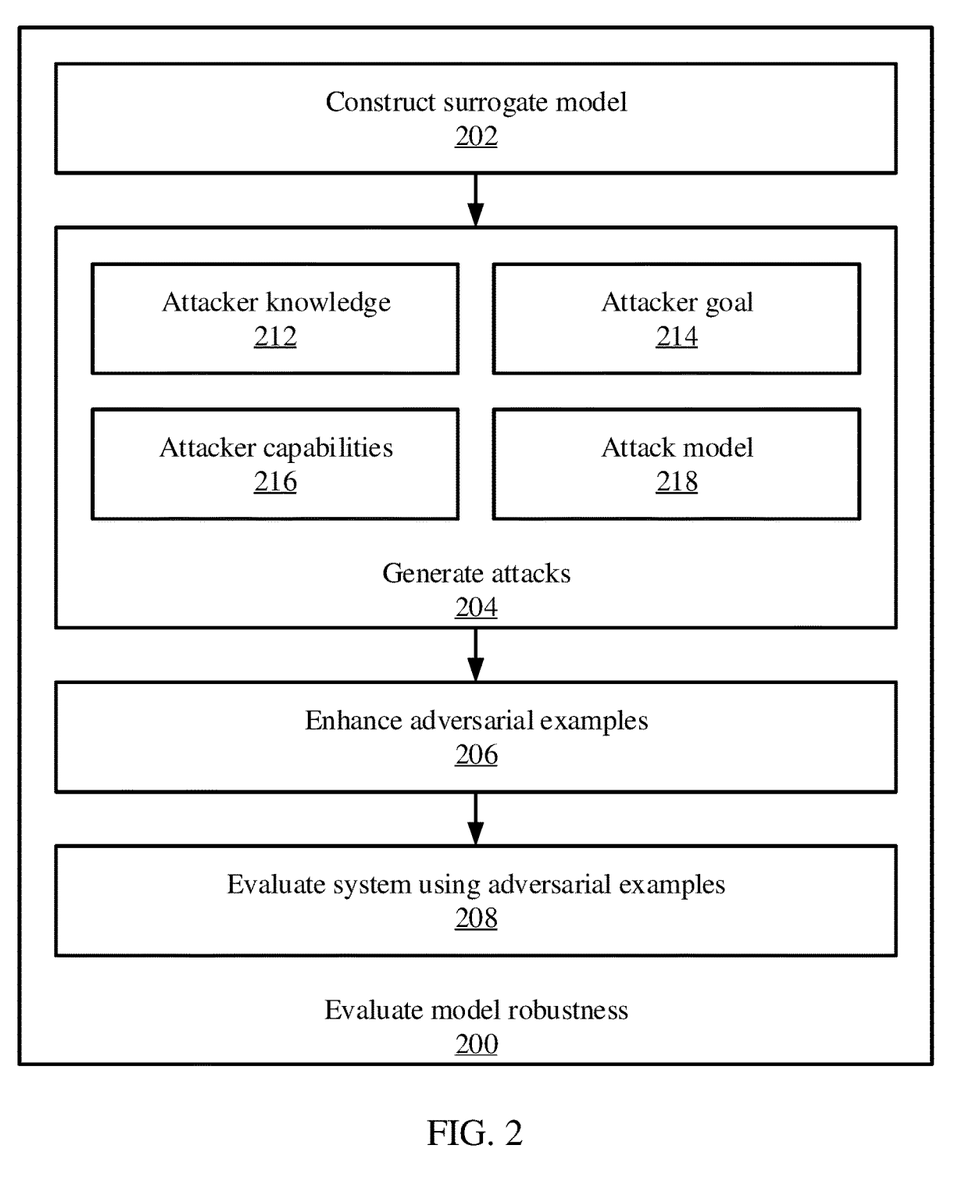
FIG. 2 is a block/flow diagram of a method for evaluating the robustness of a facial recognition model against adversarial attacks, in accordance with an embodiment of the present invention.

In particular, an attacker 112 may introduce malicious data that takes advantage of occlusion to trick the facial recognition model. In particular, physical attacks may modify physical objects, such as by wearing a mask. Such attacks may modify the actual entity, rather than digital features, should have the effect of fooling a target model, and should avoid detection, for example by adding an unsuspicious perturbation to a physical object. Wearing a mask may, for example, cause the model to fail to recognize a face, or may cause the model to recognize the face as belonging to a different person. Other types of modifications can include sunglasses/eyeglasses and makeup. Different facial recognition models may have different degrees of resistance, or robustness, to these kinds of attack. This robustness can be characterized along the following dimensions:

Attacker's knowledge of the target system 212. This dimension represents information regarding a face recognition system that is accessible to the attacker 112. Specifically, an attacker 112 may have different degrees of knowledge of the target system such as: a) Zero knowledge, where the attacker 112 has only black-access to the target system; b) The training set, where the attacker 112 has access to the target system's training data; c) The neural architecture, where the attacker 112 has access to the neural network architecture of the target system; or d) Full knowledge, where the attacker has complete information on the target system, including the training set and the neural architecture.

Another dimension of generating attacks may direct the attacks toward various goals 214. In one, dodging attacks may be generated that make it more difficult for the facial recognition system to recognize the attacker 112. In another, impersonation attacks may be generated that cause the attacker to be misidentified as a specific other person.

In a third dimension, the attacker's capabilities 216 may vary. In one type of capability, the attacker 112 can produce an individual attack for each image. In another, the attacker can produce a universal attack for a batch of photos. An attack model that addresses the latter, for example to perform a pixel-level dodging attack on a closed-set system uses a parameter N to control a number of people who can share a common perturbation to fool the target system:

$$\max_{\delta}\min\{L(S(x_i + M\delta), y_i)\}_{i=1}^{N}, \text{ s.t. } \|\delta\|_p \le \epsilon,$$

where $\{x_i, y_i\}_{i=1}^{N}$ is the set of photos x and identifiers y that share a universal perturbation $\delta$, L is the loss function, S is the machine learning model, M is the area where the perturbation is applied, E is the maximum magnitude of perturbation, and $\|\cdot\|_p$ is the $L_p$-norm. The value for p may be any appropriate value, with $L_\infty$- and $L_2$-norms being specifically contemplated. Other formulations include an optimization problem for a closed-set, grid-level attack:

$$\max_{\delta}\min\{L(S(x_i + M \cdot \mathcal{T}(\delta)), y_i)\}_{i=1}^{N}$$

an optimization problem for an open-set pixel-level attack:

$$\max_{\delta}\min\{d(S(x_i + M\delta), S(x_i^*))\}_{i=1}^{N}, \text{ s.t. } \|\delta\|_p \le \epsilon,$$

and an optimization problem for an open-set grid-level attack:

$$\max_{\delta}\min\{d(S(x_i + M \cdot \mathcal{T}(\delta)), S(x_i^*))\}_{i=1}^{N}$$

where $d(\cdot)$ is a distance metric for an open-set system (e.g., the cosine distance), and $\mathcal{T}$ is a set of transformations that convert a matrix $\delta$ into a face mask with a grid in digital space. The transformations $\mathcal{T}$ may include interpolation transformations and perspective transformations.

To find universal perturbations, the following pseudo-code expresses an approach to solving the pertinent optimization problem:

Input target system S, face image batch $\{x_i, y_i\}_{i=1}^{N}$, number of iterations T, step size $\alpha$, and momentum parameter $\mu$.

Initialize ($\delta_0$:=0, $g_0$:=0;
for each t∈ [0, T−1] do
   for each i∈ [1, N] do
     $L_{i,t}$:= $L(S(x_i+M\cdot\delta_t),y_i)$;
   end for $\ell_t = \min\{\ell_{i,t}\}_{i=1}^{N}$;

$g_{t+1} := \mu \cdot g_t + \dfrac{\nabla_{\delta_t} \ell_t}{\|\ell_t\|}$;

$\delta_{t+1} := \delta_t + \alpha \cdot \text{sign}(g_{t+1})$;

Clip $\delta_{t+1}$ such that pixel values of $x+M\cdot\delta_{t+1}$ are in [0,255/255];
end for
return $\delta_T$ The term M may identify a region of an image where a perturbation is to be applied. For a digital attack, where a small perturbation is added to an entire image in a manner that is not identifiable with the human eye, then M may be a matrix where every value is a 1. For a physical attack, where a large perturbation may be added to a limited area, then the matrix may have values of 1 for those points (e.g., pixels) where the perturbation is to be applied and values of 0 for locations where there is no perturbation. The value of E may be less than a maximum red-green-blue (RGB) value.

In another dimension, different attack models 218 may be used. For example, a grid-level face mask attack for a dodging attack on a closed-set system may be used, which can be formulated as the following optimization problem:

$$\max_{\delta} L(S(x + M \cdot \mathcal{T}(\delta)), y) \text{ s.t. } \|\delta\|_p \le \epsilon,$$

where $\mathcal{T}(\delta\cdot)$ is a three-dimensional transformation that takes a face mask image from a two-dimensional space to a three dimensional-space. An optimization problem for grid-level face mask impersonation attack on a closed-set system may be expressed as:

$$\min_{\delta} L(S(x + M \cdot \mathcal{T}(\delta)), y_t)$$

where $y_t$ is the target label that the attacker wants to be misrecognized as. An optimization problem for a grid-level face mask dodging attack in an open-set system may be expressed as:

$$\max_{\delta} d(S(x + M \cdot \mathcal{T}(\delta)), S(x^*))$$

where x* is the gallery image of x (gallery image is stored in the system; dodging attack on open-set systems wants to maximize the distance between the representation of adversarial example and the representation of gallery photo). An optimization problem for a grid-level face mask impersonation attack in an open-set system may be expressed as:

$$\min_{\delta} d(S(x + M \cdot \mathcal{T}(\delta)), S(x_t^*))$$

where $x_t$* is the gallery image (stored in the system) of the target person that the attacker wants to be recognized as. As above, the transformations $\mathcal{T}$ may include interpolation transformation and perspective transformation.

The interpolation transformation may start from a color matrix $\delta$ having dimensions a×b and may scale $\delta$ to a face image. The transformation may resize the color matrix $\delta$ from a×b to a rectangle $\delta'$ with dimensions c×d, to reflect the size of a face mask in the face image in digital space, while preserving the layout of color grids represented by $\delta$. For example, each input face image may have 224×224 pixels. In this illustrative example, (a,b)=(8,16) and (c,d)=(80,160). The face mask $\delta'$ may be applied to a background image, such that the pixels in the rectangular area are set to be equal to the values of $\delta'$, and those outside the face mask area have values of 0.

The perspective transformation may be used to align the face mask to the face in the image. Once the rectangle $\delta'$ is embedded into a background image, two-dimensional alignment that uses perspective may be performed. The face mask image $\delta'$ may be divided into a left half $\delta_L'$ and a right half $\delta_R'$, with each being rectangular. The perspective transformation may be applied to project each part to aligned coordinates, such that the new coordinates align with the position of a face mask as worn on a human face. Letting $\delta_L"$ and $\delta_R"$ be the left and right part of an aligned face mask, the perspective transformation finds a 3×3 matrix $N_K$, with $k \in (L, R)$, for each part such that the coordinates satisfy $$\delta_k"(x,y) = \delta_k'(u,v)$$

where $$u = \frac{N_k(1,1)x + N_k(1,2)y + N_k(1,3)}{N_k(3,1)x + N_k(3,2)y + N_k(3,3)}$$

and $$v = \frac{N_k(2,1)x + N_k(2,2)y + N_k(2,3)}{N_k(3,1)x + N_k(3,2)y + N_k(3,3)}$$

Finally, the portions $\delta_L"$ and $\delta_R"$ may be merged to obtain an aligned grid-level face mask.

Referring now to FIG. 2, a method of evaluating the robustness of a facial recognition system is shown. When the attacker has partial knowledge of the facial recognition system, transferred attacks may be used to assess a level of risk. During evaluation 200, a surrogate model can be constructed as an approximation of the target system, based on an assumed degree of knowledge of the system. As will be described in greater detail below, these assumptions correspond to different objective functions. The generation of the surrogate model and attacks against the surrogate model may be automated, with various different assumptions being simulated.

The objective functions may, in accordance with an appropriate surrogate model or surrogate model ensemble, be used to identify perturbations $\delta$ that may be used to generate attacks 204. These attacks may take the form of, for example, images of a person's face with one or more alterations being performed. Thus, attacks can be produced 204 that rely on various attack models. The generation of adversarial samples can take into account various different dimensions of an attacker scenario, including attacker knowledge 212, the attacker's goal 214, the attacker's capabilities, 216, and the attack model 216. Different types of attack may include, e.g., a sticker attack that puts adversarial stickers on a human face, a face mask attack that adds a grid-level face mask, and a universal attack that produced an occlusion that can be shared by multiple attackers.

The transferability of the adversarial examples may be enhanced 206, and these enhanced examples may be used to evaluate 208 the robustness of the target system. Evaluation of the target system may include using the generated adversarial samples as inputs to the target system, to determine what the facial recognition of the target system is using the adversarial samples. A substantially decreased degree of accuracy indicates that the target system is not robust against the kinds of adversarial attacks described herein, and that an attacker could fool the target system by, for example, wearing a face mask with a pattern that matches an effective attack sample.

To enhance the transferability of the adversarial examples in response to the surrogate model in block 206, ensemble-based surrogate models and momentum-based optimization may be used to find perturbations. For example, an objective function may be used:

$$\max_{\delta} L\left(\sum_{i=1}^{K} \alpha_i h_i(x + M\delta), y\right) \text{ s.t. } \|\delta\|_p \le \epsilon,$$

where $\delta$ is an adversarial perturbation to be optimized, x is an input image, y is an identifier for the input image, L is the loss function (such as a cross-entropy loss), $\{h_i\}_{i=1}^{k}$ is an ensemble model, $\alpha_i$ is a weight for each respective ensemble model $h_i$, and M is an area where the perturbation is applied.

Using a momentum-based optimization, the objective function can be solved by iteratively applying:

$$g_{t+1} = \mu \cdot g_t + \frac{\nabla_\delta L}{\|\nabla_g L\|_1}$$

$$\delta_{t+1} = \delta_t + \alpha \cdot \text{sign}(g_{t+1})$$

$$\delta_{t+1} = f \cdot \delta_t$$

The last equation limits the perturbation to the area set by f.

For a given face recognition system, denoted as S, the robustness of the system can be expressed as E(S, <K, G, C, P>), where <K, G, C, P> represents an attacker trying to produce adversarial examples to fool S. K denotes the attacker's level of knowledge, which may be understood as the information about which sub-components of S are leaked to the attacker. G represents the attacker's goal, such as the circumvention of detection and the misrecognition as a target identity. C represents the attacker's capability. An example of such capability may include a determination of whether an attacker can either individually perturb each input face image, or produce universal perturbations for images batch-wise. The term P represents perturbation type, such as perturbation produced by pixel-level digital attacks and physically realizable attacks.

To evaluate the attacker's level of knowledge K, the zero-knowledge scenario can establish an upper bound of the robustness of S, while the full-knowledge scenario can establish a lower bound. It can be difficult to evaluate the robustness of the target system when only partial knowledge is available. In addition, producing physically realizable attacks is susceptible to local optima in solving respective non-convex optimization problems.

A surrogate model can therefore be used, using accessible knowledge and surrogate knowledge, as a work-around for the lack of full knowledge of the target system. For example, if only the training data is available, a surrogate model S' can be constructed using the training set and a surrogate neural architecture. To address the possibility that the surrogate model S' will not match the actual target model, an ensemble-based surrogate model can be used to improve transferability. The ensemble of surrogate models is used to test perturbations $\delta$, because if a single perturbation can fool the ensemble, then it has generalizability that makes it transferable to single models. Meanwhile, the use of momentum-based gradient descent to solve the optimization problem can help avoid local optima.

Because dodging attacks and impersonation attacks represent different attacker goals, and both can work on closed-set and open-set systems, a collection of objective functions is described herein to handle each case. For dodging attacks to closed-set systems, the attacker's goal is to maximize the probability of an input image x being classified as something other than the true label (e.g., identity) y. The objective may therefore be:

$$\max_{\delta} L(S(x + M\delta), y), \text{ s.t., } \|\delta\|_p \leq \epsilon,$$

where S is a model (or ensemble of models). For impersonation attacks to closed-set systems, the attacker has two goals: to maximize the probability of misclassification and to minimize the loss for the image x being classified as a particular target identity $y_t^*$. In this case, the objective may be:

$$\min_{\delta} L(S(x + M\delta), y_t^*), \text{ s.t. } \|\delta\|_p \leq \epsilon,$$

For dodging attacks on open-set systems, the attacker aims to maximize the distance between the feature vector of the image x and the corresponding stored photo x*, to maximize the likelihood of being recognized as the other identity. In this case, the objective function may be expressed as:

$$\max_{\delta} D(S(x + M\delta), S(x^*)) \text{ s.t. } \|\delta\|_p \leq \epsilon$$

where D is a distance function. For impersonation attacks to open-set systems, the attacker's goal is to minimize the distance between the feature vector of the image and that of the target identity $x_t^*$. In this case, the objective function may be:

$$\min_{\delta} D(S(x + M\delta), S(x_t^*)) \text{ s.t. } \|\delta\|_p \leq \epsilon$$

To evaluate an attacker's attack capability, individual attacks and universal attacks may be considered. For an individual attack, the attacker is able to produce an individual, physically realizable perturbation for each input image. For example, the attacker can devise an adversarial face mask or eyeglass frame in response to each of the test images to fool the target face recognition system. This represents a relatively high level of attacker capability. Physically realizable attacks can be implemented in physical space, for example by applying a special type of occlusion to the attacker's face that may not be suspicious to onlookers, but that may trick the facial recognition system. In contrast, digital attacks apply a digital transformation to an image, resulting in an altered image that may appear identical to the original to the human eye, but that may nonetheless cause a neural network to output incorrect results. One potential point of distinction between digital attacks and physically realizable attacks is that digital attacks may add small perturbations to an entire image, while physically realizable attacks may add large perturbations to a restricted area of the image, such as by adding stickers, eyeglasses, or face masks.

For a universal attack, for example where the attacker is unable to perform an individual attack for each input image, perturbations may be shared across multiple different images. A parameter N represents the batch size of input samples that share a perturbation. When N=1, the universal attack scenario reduces to the individual attack scenario.

Formally, the universal attack solves the following optimization problem, using dodging attacks on a closed-set system as an example:

$$\max_{\delta} \min\{L(S(x_i + M\delta), y_i)\}_{i=1}^N, \text{ s.t. } \|\delta\|_p \leq \epsilon$$

where $\{x_i, y_i\}_{i=1}^N$ are the batches of images that share the universal perturbation $\delta$, and where M is the area where perturbation is allowed. Momentum-based gradient descent may be used to solve the optimization problem, to avoid local optima.

Evaluating the attack models that may be used, available attack models may vary by the locations in the images on which realizable perturbations are allowed. Three exemplary physically realizable attack models include an eyeglass frame attack, a sticker attack, and a grid-level face mask attack. Digital attack models may also be considered, where undetectable perturbations are added to an entire image. For such digital attacks, a momentum-based method may be used to optimize the following optimization problem:

$$\arg\max_{\delta} L(S(x + \delta), y), \text{ s.t. } \|\delta\|_p \leq \epsilon$$

Pixel-level physically realizable attacks, such as the eyeglass frame attack and the sticker attack, may use the following optimization problem, as both are variants on an adversarial occlusion attack:

$$\arg\max_{\delta} L(S(x + M\delta), y), \text{ s.t., } \|\delta\|_p \leq \epsilon$$

As with the objective functions above, this optimization problem may be solved using a momentum-based gradient descent.

For the grid-level face mask attack, an attacker attempts to find color grids of a face mask that can mislead the target system. The resulting perturbation may be more realistic, as most face masks are made of cloth or non-woven fabrics, so pixel-level perturbation is difficult to implement. The face mask attack may use the following optimization problem:

$$\arg\max_{\delta} L(S(x + M\mathcal{T}(\delta)), y), \text{ s.t. } \|\delta\|_p \leq \epsilon$$

where $\delta$ is a color matrix, with each element of $\delta$ representing a color grid. The function $\mathcal{T}(\cdot)$ is a three-dimensional transformation, which transforms a color grid to a face mask in a three-dimensional space. A color matrix may initially have a×b grids, where a and b are any appropriate dimension. The matrix may then be scaled into a photo with c×d pixels in a two-dimensional space, where c and d may correspond to transformations of the dimensions a and b. Two perspective transformations may be used to transform the left and right halves of the two-dimensional face mask into the three-dimensional space. The three-dimensional face mask may then be used to occlude a human face in an image.

For example, adversarial face mask images may be generated by determining a color grid that may be applied to a person's face in an image to trick the facial recognition system. Such an attack may be physically realizable by identifying an effective color grid and then creating actual face masks that an attacker may wear, whether to cause a misidentification or a non-identification by the facial recognition system. To generate such a face mask image, for example in the context of a dodging attack on a closed-set system, the following pseudo-code may be used. Other types of attack on other types of system may be implemented by choosing the appropriate optimization problem.

Input target system S, face image x and a corresponding identity y, a number of iterations T, a step size $\alpha$, and a momentum parameter $\mu$;
Initialize the color matrix $\delta_0 := 0$, momentum $g_0 := 0$;
Use interpolation and perspective transformations to convert $\delta_0 : \delta_0'' := \mathcal{T}(\delta_0)$;
for each $t \in [0, T-1]$ do $$g_{t+1} := \mu \cdot g_t + \frac{\nabla_{\delta_t} L(S(x + M \cdot \delta_t''), y)}{\|L(S(x + M \cdot \delta_t''))\|_1}$$

$$\delta_{t+1} := \delta_t + \alpha \cdot \mathrm{sign}(g_{t+1});$$

$$\delta_{t+1}'' := \mathcal{T}(\delta_{(t+1)});$$

Clip $\delta_{t+1}''$ such that pixel values for $x+M \cdot \delta_{t+1}''$ are in $[0, 255/255]$;
end for
return $\delta_T$ To evaluate the robustness of a given facial recognition model, using these different dimensions of the potential attacks, white box attacks and surrogate model attacks are used, with the former being used when full knowledge is available, and the latter being used when only the neural architecture is available. The surrogate model may be trained using the same neural architecture as the target model being evaluated, but a substitute training set may be used which has the same input characteristics and identities. White box attacks can then be conducted using the surrogate model to evaluate the target model.

When only the training set is accessible to the attacker, multiple surrogate models may be trained using different substitute neural network architectures. White box attacks may then be performed on the multiple surrogate models. When zero knowledge is exposed to the attacker, surrogate models may be trained with both a substitute training set and substitute neural architectures, before the white box attacks may be used.

In general, knowledge of the target model architecture provides better opportunities for attacks than knowledge of the training set. When only the neural network architecture is available to the attacker, adversarial examples generated responsive to the trained surrogate model exhibit high transferability on the target model. When only the training set is available to the attacker, the transferability is significantly lower. Thus, for closer-set face recognition, knowledge of both the training set and the architecture contribute to the vulnerability of the system to realizable attacks, but the knowledge of the neural network architecture contributes more. Additionally, closed-set recognition is more vulnerable to grid-level face mask attacks as compared to other physically realizable attacks. For example, when either training set or neural architecture is known to the attacker, the face mask attack can achieve a >40% higher attack success rate than the sticker attack.

Open-set face recognition systems are significantly more vulnerable to physically realizable attacks than to digital attacks when the attacker has zero knowledge about the target system, with transferability being up to about 50% better for realizable attacks. Open-set face recognition is also more vulnerable to adversarial examples as compared to closed-set face recognition. For example, when no internal information is leaked to an attacker, closed-set face recognition remains robust to realizable attacks, while open-set face recognition can misclassify 80% of adversarial examples. This shows that different types of face recognition systems exhibit different levels of robustness against physically realizable attacks.

Both using an ensemble-based source model and the momentum-based gradient descent optimization can improve the transferability of digital attack examples. The transferability of projected gradient descent attacks can be significantly improved by both techniques.

Robustness against universal attacks can also be evaluated. Neural networks can be fooled by adding perturbations to all of the input dataset, and face recognition models are vulnerable to such attacks. White box universal attacks may be generated, as described above, by controlling the universality parameter N, which governs the batch size of images that share a given perturbation. Closet-set face recognition models can vary in their robustness against different universal attacks. When $N \geq 10$, many models exhibit high robustness against sticker attacks, moderate robustness against projected gradient descent and eyeglass attacks, and low robustness against face mask attacks. Furthermore, face recognition models have relatively consistent robustness against different kinds of attack.

Figure 3:
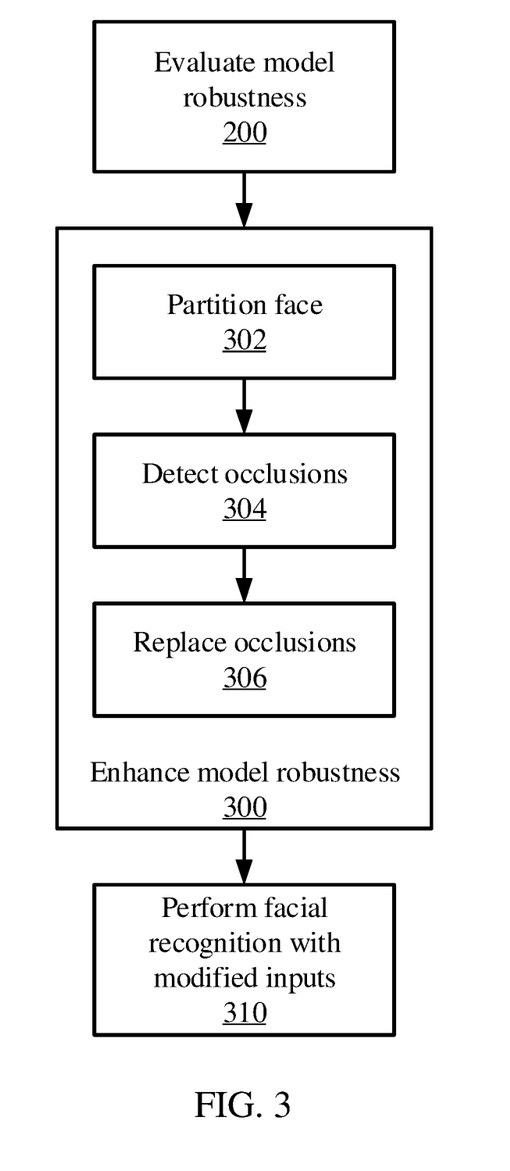
FIG. 3 is a block/flow diagram of a method for evaluating and enhancing the robustness of a facial recognition model, in accordance with an embodiment of the present invention.

Referring now to FIG. 3, a method of evaluating and bolstering the robustness of a facial recognition model is shown. Having the results of the robustness evaluation 200, it can be determined that a given model is insufficiently robust against adversarial attacks. Block 300 provides a general robustness enhancement framework for face recognition systems, which can defend such systems against multiple types of attack. The enhancement makes use of a game-theoretic model to defend against adaptive attacks that can produce "best response" adversarial examples. The enhancement of block 300 may be performed without performing the evaluation of block 200 first.

The robustness enhancement of block 300 may be used to protect any facial recognition system, and may illustratively be implemented as a set of binary classifiers or detectors and an occlusion replacement component. This system is used on input images before they are passed to facial recognition. As will be described below, block 304 detects occlusions within a partitioned face image and block 306 replaces detected occlusions. The modified input image is then used for facial recognition in block 310, with any potentially harmful occlusions having been removed by harmless graphical information. Thus, nothing needs to be changed in the facial recognition model itself, as the input images themselves are changed to remove harmful content.

Enhancing the robustness of the model includes detecting occlusions in an input image, for example using an ensemble of binary classifiers. These binary classifiers may be trained using adversarial training, using any appropriate training dataset. Game theory-based occlusion replacement can then be used to defend against adaptive attacks. The game theory-based design handles reactive attacks, where the attacker knows details of the defense design. While the enhancement is described in the specific context of facial recognition systems, it can be applied to other artificial intelligence to enhance their robustness against attacks. For example, attacks which put a sticker on a traffic sign to fool autonomous driving systems may be enhanced using a similar approach.

Block 302 performs partitioning of input face images into different face areas. This can help for unknown input face images to be recognized by providing semantic segmentation, and can further provide a way to label the collected data for further synthesis when training occlusion detectors. The face images may be partitioned into disjoint areas, such as left forehead, right forehead, left eye, right eye, left face, right face, nose, and chin. These eight face areas are provided for the sake of example, and it should be understood that more or fewer areas may be used instead. Thus, given an input image x, block 302 detects face areas, and a face landmark predictor returns right masks $\{z_i\}_{i=1}^8$, each of which has the same dimension as x and corresponds to a respective one of the face areas. For pixels of each mask $z_i$, if the pixel is outside the corresponding face area, then the pixel value is set to zero. Otherwise, the pixel value is set to one.

For applications other than face detection, the face partitioning 302 may be replaced with an alternative partitioning. For example, for traffic sign images, an N×N grid may be used to partition the input images, with an occlusion detector being trained for each grid square. Any appropriate dimension and shape of the partitions may be used.

Block 304 detects occlusion within the input images, and may include a set of occlusion detectors that correspond to respective partitioned areas from block 302. Block 304 collects a meta dataset for training purposes. Toward this end, block 304 may randomly collect a large number (e.g., over 10,000) of frontal face images that do not include occlusions, such as eyeglasses or masks. These images may be drawn from any available dataset, and may be denoted as $\{x_i\}_{i=1}^{10,000}$. For each image $x_i$, the image may be partitioned by block 302 to obtain masks for the different face areas, e.g., $\{z_{ij}\}_{j=1}^8$, where j represents the face areas defined above.

Block 304 next synthesizes a training dataset from the meta dataset for each of the face areas. Occlusion detection may include a set of binary classifiers $\{h_j\}_{j=1}^8$, each detecting whether there is an occlusion in the corresponding face area. To train each classifier $h_j$, positive and negative samples may be synthesized.

To synthesize positive samples, for each face area j, face images are provided that do have an occlusion on the corresponding face area. These face images may also have an occlusion on other face areas. Thus, eight random numbers may be generated between 0 and 1, denoted as $\{p_k\}_{k=1}^8$. The same number of matrices may be generated, having the same dimension as $x^i$, denoted as $\{g_k\}_{k=1}^8$. Each value in $g_k$ may be generated using a uniform distribution. Afterward, the positive sample $x_{ij}^+$ may be generated to correspond to face area j in $x_i$, as:

$$x_{ij}^+ = z_{ij} \circ g_j + \sum_{k \ne j}\{1[p_k \le t]z_{ik} \circ g_k + 1[p_k > t](I - z_{ik}) \circ x_{ik}\}$$

where 1[•] is an indicator function that outputs 1 if the bracketed expression is true, such that $1[p_k \le 1]=1$ if $p_k \le 1$, and $1[p_k \le t]=0$ otherwise, where I is an all-one matrix that has the same dimension as $x_i$, $\circ$ denotes an element-wise multiplication operator, and t is a probability. Thus $x_{ij}^+$ may be produced by occluding face area j with a random perturbation, while occluding other areas with probability t.

To synthesize negative samples, which do not have any occlusion on the face area j, but may have occlusions on other areas, the negative samples $x_{ij}^-$ may be determined as:

$$x_{ij}^- = (I - z_{ij}) \circ x_{ij} + \sum_{k \ne j}\{1[p_k \le t]z_{ik} \circ g_k + 1[p_k > t](I - z_{ik}) \circ x_{ik}\}$$

The positive and samples may be merged into a single dataset. For all positive samples $x_{ij}^+$, a label of 1 may be applied, and for all negative samples $x_{ij}^-$, a label of 0 may be applied. The end result is j datasets for training the respective occlusion detectors.

This training may include separately training each of the binary classifiers of the occlusion detector with their respective training datasets. For example, a pre-trained face recognition model may be used with transfer learning. The pre-trained model may be, e.g., a convolutional neural network (CNN). Given an input face image, such models transform the image into a compact representation (e.g., having fewer dimensions than the original input), which may be used for downstream tasks, such as classification and verification. A linear layer is added that includes two neurons, for binary classification, on top of the pre-trained model. This combined neural network may be trained for each of the classifiers, using the synthesized training data to produce a classifier $h_j$ for each of the face regions.

The occlusion detector can further be trained in an adversarial manner, to increase its robustness against adversarial attacks that attempt to bypass occlusion detection. Additional detail is provided below. Once all of the binary classifiers are retrained using adversarial training, they can be applied to determine whether a test image $x_t$ is occluded for each face area j.

Block 306 performs occlusion replacement, whereby a face area is covered by a solid-color occlusion if an occlusion is detected within the area, such that the adversarial occlusion can be mitigated. Occlusion replacement includes a game theory approach to selecting occlusion parameters, after which the detected occlusion can be covered with a new occlusion using the selected parameters.

The occlusion selection enhances robustness against adaptive attackers while it selects the best parameters for an occlusion replacement. A game model may be used that includes a defender and an attacker. The attacker can observe the defense action and perform a best-response attack. The defender moves first by choosing a distribution over different combinations of occlusion colors, shapes, and sizes (the occlusion parameters). The attacker observes the defender's choice and moves by choosing a distribution over different combinations of locations to produce physically realizable attacks.

The game model can be formulated as:

$$\max_{s_D, a_T^*} \sum_n s_{D_j} u_D(n, a_T^*)$$

$$\text{s.t.} \sum_n s_{D_n} = 1$$

$$\sum_n s_{D_n} u_T(n, a_T^*) \ge \sum_n s_{D_n} u_T(n, a_T) \forall\, a_T \in A_T$$

where $s_D$ is the defender's distribution over different parameters, $a_T$ is the attacker's attack location, $a_T^*$ is a best location for the attacker at equilibrium, $u_D$ and $u_T$ are the utilities of the defender and the attacker, and $A_T$ is a collection of attack locations that the attacker can choose from. Since this expression makes use of game theory, the solution may be understood as an equilibrium which includes both $s_D$ and $a_T$*. At equilibrium, neither can obtain more benefit if they deviate from the equilibrium point.

The bi-level optimization can be solved by, for each $a_T \in A_T$, solving the corresponding linear problem and then comparing the defender's utilities, associated with each linear programming problem, to one another. The distribution $s_D$, that corresponds to the largest defender's utility is selected as the defender's final strategy.

Once the distribution of parameters S D is calculated, an occlusion is selected to replace the original occlusion. This replacement for a test image $x_t$ may be expressed as:

$$x_t^* = \sum_{j=1}^{8} \{1[h_j(x_t) = 1] x_{tj} \circ \delta(s_D) + 1[h_j(x_t) \neq 1](I - z_{tk}) \circ x_t\}$$

where $x_t^*$ is the modified image that corresponds to the input image $x_t$, $\delta(s_D)$ is the occlusion that is added onto the image, using the parameters $s_D$.

Figure 4:
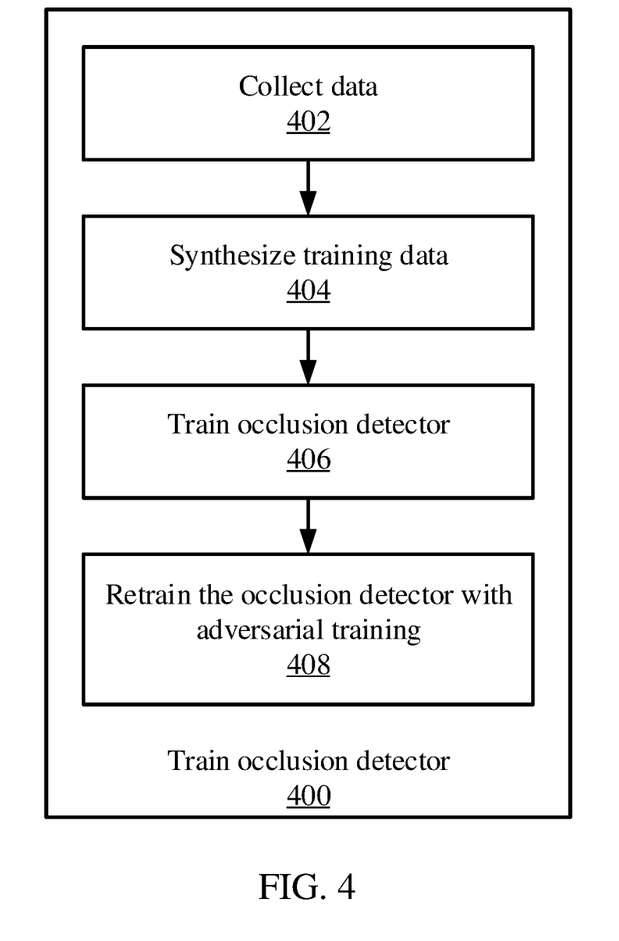
FIG. 4 is a block/flow diagram of a method of detecting occlusions in an input image, in accordance with an embodiment of the present invention.

Referring now to FIG. 4, detail training 400 of an occlusion detector used in block 304 is shown. As noted above, block 402 collects data and block 404 uses the collected data to synthesize training data for a set of binary classifiers in the occlusion detector. Block 406 uses the synthesized training data to train the occlusion detector. The detector may be retrained in block 408, using adversarial samples. The retrained occlusion detector may be used in by block 304 to detect occlusions within input images.

To retrain the detector in an adversarial manner, the classifiers $h_j$ are retrained. For each positive sample in the training data for a classifier $h_j$, an adversarial attack is executed to produce an adversarial sample $x_{ij}^*$, for example by solving the optimization problem:

$$\max_{\delta} L(h_j(x_{ij}^*(\delta)), y_{ij}^*)$$

where $$x_{ij}^* = z_{ij} \circ \delta + \sum_{k \neq j} 1[p_k \leq t] z_{tj} \circ g_k + 1[p_k > t](I - z_{ik}) \circ x_{ik}$$

and where L is the loss function used to train $h_j$, and $y_{ij}^*$ is the label of $x_{ij}^*$. This may be solved by any appropriate gradient-based optimizer.

The values of $x_{ij}^*$ are then added back into the training data of $h_j$, and $h_j$ is retrained using the updated training dataset. This process may be repeated, with new adversarial samples, until either a fixed number of iterations or until an adversarial sample cannot be found.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 5:
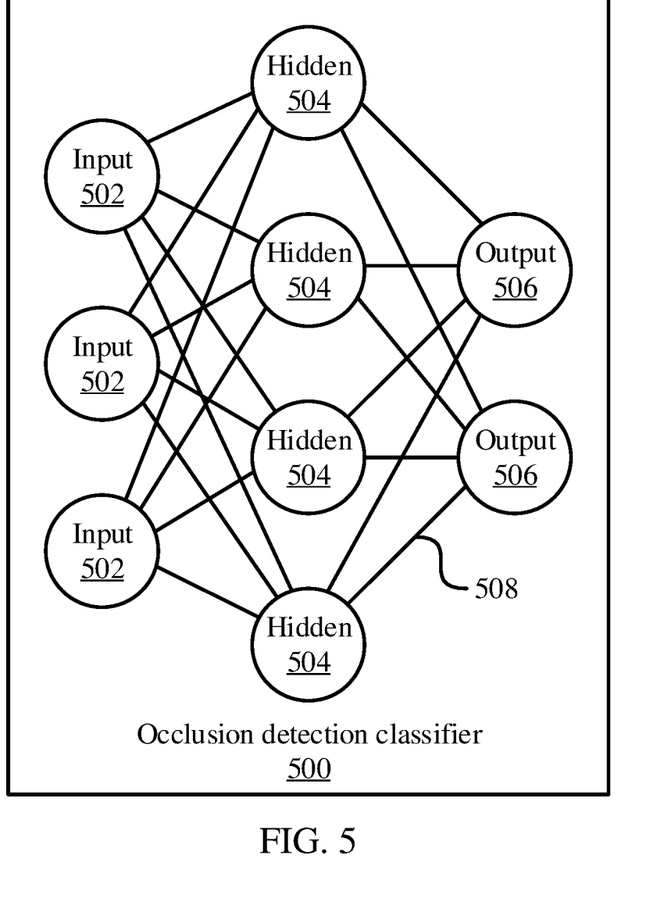
FIG. 5 is a diagram of an exemplary occlusion detection classifier, in accordance with an embodiment of the present invention.

Referring now to FIG. 5, a generalized diagram of a neural network is shown. ANN architectures may be used to implement the models described herein, for example as an occlusion detection classifier 500. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted, and these weighted inputs are then processed by the hidden neurons 504 according to some function in the hidden neurons 504. There can be any number of layers of hidden neurons 504, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "backpropagation" computation, where the hidden neurons 504 and input neurons 502 receive information regarding the error propagating backward from the output neurons 506. Once the backward error propagation has been completed, weight updates are performed, with the weighted connections 508 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 508 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

It is particularly contemplated that convolutional neural network (CNN) layers may be used to implement some functions of the models described herein. CNNs process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
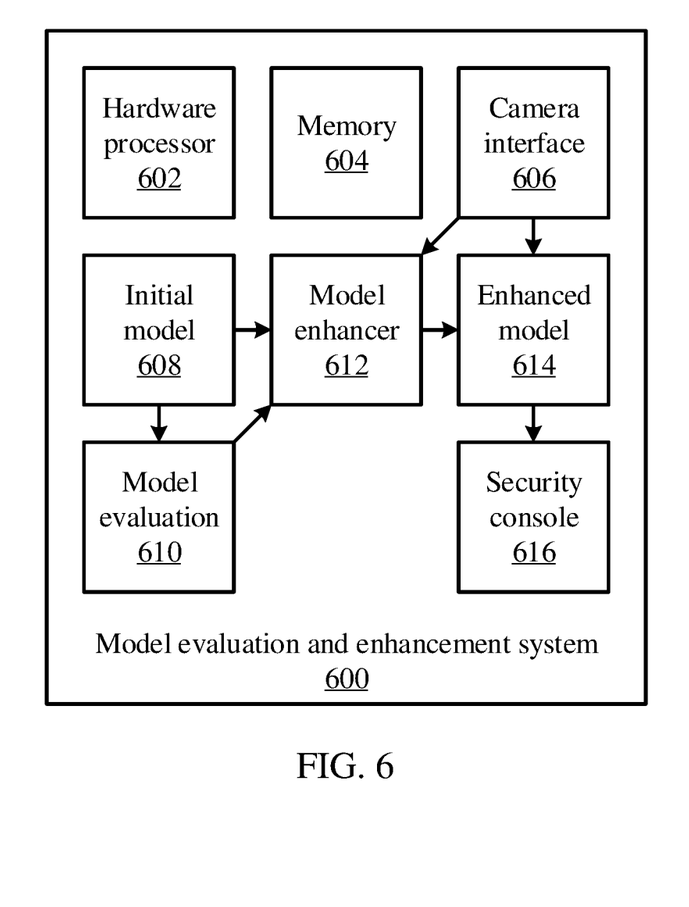
FIG. 6 is a block diagram of a system for evaluating and enhancing the robustness of a facial recognition model, in accordance with an embodiment of the present invention.

Referring now to FIG. 6, a model evaluation and enhancement system 600 is shown. The system 600 includes a hardware processor 602 and a memory 604. A camera interface 606 communicates with the cameras 114 to collect respective streams of video information. The camera interface 606 may communicate with the cameras 114 via a dedicated connection, such as by a direct video cable, or through a general purpose communications medium, such as a computer network. The camera interface 606 may communicate by any appropriate wired or wireless medium and protocol.

An initial model 608 is provided. The initial model 608 may include a predetermined neural network architecture and training dataset. Model evaluation 610 may be performed to identify weaknesses in the initial model 608, for example by determining whether the initial model 608 is robust against various types of adversarial attack.

A model enhancer 612 acts to enhance the robustness of the initial model 608. As described above, this may be performed by detecting and replacing occlusions within training images. The model enhancer 612 outputs an enhanced model 614, which may then be used to perform face recognition, or any other appropriate visual identification task.

A security console 616 uses the enhanced model 614 to take an appropriate action. For example, the enhanced model 614 may be used for authentication purposes, to identify faces that belong to users in a list of authorized users. The security console 616 can then unlock a door or perform some other action to grant access to the authorized users. In another example, the security console 616 may perform a security action to respond to access by an unauthorized individual, such as locking doors, sounding an alarm, and summoning security personnel.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of evaluating and enhancing a neural network model, comprising:
constructing a surrogate model that corresponds to a target neural network model, based on a degree of knowledge about the target neural network model;
generating adversarial attacks against the surrogate model, based on an attack goal, a level of attacker capability, and an attack model;
testing the target neural network model for accuracy under the generated adversarial attacks to determine a degree of robustness of the target neural network; and
enhancing robustness of the target neural network model by replacing facial occlusions in input images before applying the input images to the target neural network.

2. The method of claim 1, wherein constructing the surrogate model includes generating an ensemble of surrogate models for a target neural network model for scenarios lacking information about a structure of the target neural network.

3. The method of claim 1, wherein generating adversarial attacks includes generating attacks according to multiple different sets of assumptions about the attack goal, the level of attacker capability, and attack model.

4. The method of claim 1, wherein the attack model is selected from a group consisting of grid-level attacks and pixel-level attacks.

5. The method of claim 1, wherein adversarial attacks are generated for attack goals that include dodging attacks and impersonation attacks.

6. The method of claim 1, wherein generating the adversarial attacks includes solving optimization problems that correspond to different respective combinations of attack model and attack goal.

7. The method of claim 1, wherein generating the adversarial attacks includes applying an occlusion to an image.

8. The method of claim 7, wherein applying the occlusion to the image includes performing a transformation selected from the group consisting of an interpolation transformation and a perspective transformation.

9. The method of claim 7, wherein the occlusion is selected from the group consisting of an eyeglass frame shape, a sticker shape, and a face mask shape.

10. The method of claim 1, wherein generating the adversarial attacks includes generating digital attacks that affect an entire input image.

11. A method of evaluating and enhancing a neural network model, comprising:
constructing an ensemble of surrogate models that correspond to a target neural network model, based on lack of attacker knowledge about a structure of the target neural network model;
generating adversarial attacks against the surrogate model, according to multiple different sets of assumptions about an attack goal, a level of attacker capability, and an attack model, by solving optimization problems that correspond to different respective combinations of attack model and attack goal;
testing the target neural network model for accuracy under the generated adversarial attacks to determine a degree of robustness of the target neural network; and
enhancing robustness of the target neural network model by replacing facial occlusions in input images before applying the input images to the target neural network.

12. A system for evaluating and enhancing a neural network model, comprising:
a hardware processor; and
a memory that stores a computer program product, which, when executed by the hardware processor, causes the hardware processor to:
construct a surrogate model that corresponds to a target neural network model, based on a degree of knowledge about the target neural network model;
generate adversarial attacks against the surrogate model, based on an attack goal, a level of attacker capability, and an attack model;

test the target neural network model for accuracy under the generated adversarial attacks to determine a degree of robustness of the target neural network; and generate an occlusion replacer that replaces facial occlusions in input images before applying the input images to the target neural network.

13. The system of claim 12, wherein the computer program product further causes the hardware processor to generate an ensemble of surrogate models for a target neural network model for scenarios lacking information about a structure of the target neural network.

14. The system of claim 12, wherein the computer program product further causes the hardware processor to generate attacks according to multiple different sets of assumptions about the attack goal, the level of attacker capability, and attack model.

15. The system of claim 12, wherein the attack model is selected from a group consisting of grid-level attacks and pixel-level attacks.

16. The system of claim 12, wherein adversarial attacks are generated for attack goals that include dodging attacks and impersonation attacks.

17. The system of claim 12, wherein the computer program product further causes the hardware processor to solve optimization problems that correspond to different respective combinations of attack model and attack goal.

18. The system of claim 12, wherein the computer program product further causes the hardware processor to an occlusion to an image for the adversarial attacks.

19. The system of claim 18, wherein the computer program product further causes the hardware processor to perform a transformation on the occlusion selected from the group consisting of an interpolation transformation and a perspective transformation.

20. The system of claim 18, wherein the occlusion is selected from the group consisting of an eyeglass frame shape, a sticker shape, and a face mask shape.

* * * * *